United States Patent [19]

Tartaglino

[11] Patent Number: 4,783,045

[45] Date of Patent: Nov. 8, 1988

[54] INFLATABLE BLADDER FOR CONTROL OF FLUID FLOW

[76] Inventor: Jerry J. Tartaglino, 4911 W. Hanover, Dallas, Tex. 75209

[21] Appl. No.: 78,966

[22] Filed: Jul. 29, 1987

[51] Int. Cl.[4] .......................................... F16K 31/385
[52] U.S. Cl. .................................... 251/61.1; 92/92; 236/49; 251/5
[58] Field of Search ................ 236/49; 92/92; 251/5, 251/61.1

[56] References Cited

U.S. PATENT DOCUMENTS

| | | | |
|---|---|---|---|
| 2,641,282 | 6/1953 | Hazlett | 251/5 |
| 2,982,511 | 5/1961 | Connor | 251/5 |
| 3,103,300 | 9/1963 | Lau | 251/5 |
| 3,292,718 | 12/1966 | Stone | 251/5 X |
| 3,552,712 | 1/1971 | Whitlock | 251/5 |
| 4,108,418 | 8/1978 | Ensign et al. | 251/5 |
| 4,268,005 | 5/1981 | Raftis et al. | 251/5 |
| 4,303,100 | 12/1981 | Kalb | 251/5 X |
| 4,494,345 | 1/1985 | Peterson | 251/5 X |

FOREIGN PATENT DOCUMENTS

| | | | |
|---|---|---|---|
| 513821 | 9/1952 | Belgium | 251/5 |
| 99220 | 10/1961 | Netherlands | 251/5 |

OTHER PUBLICATIONS

IBM Technical Disclosure Bulletin to G. A. Lenike, vol. 8, No. 6, Nov. 1965.

*Primary Examiner*—William E. Tapolcai
*Attorney, Agent, or Firm*—Charles F. Schroeder

[57] ABSTRACT

A portable self-deflating fluid inflatable bladder adaptable to use as a damper for control of fluid flow in fluid supply systems and more specifically for control of air flow in heating and air conditioning ducts such as may be effectively used in zone controlled air conditioning systems. The bladder is an assembly of two layers of sheet material sealed together, one layer being a flat base sheet of semi-rigid flexible material having an internal memory causing it to return to its flat shape upon removal of flexing forces, the other layer being a flexible conformable material without shape memory so that it responds to make space for the volume of air pumped between the layers by way of a connection thereto. Inflation stresses on the base sheet cause it to be self-deflating and enables the bladder to be closely regulated in size for corresponding close control of air flow through an air passage in which the bladder is installed. It is manually insertable in a flow passageway without need for modification of existing systems. The bladder can be made cylindrical in form for insertion in circular, oval, square or rectangular shaped passageways. Auxiliary blocking members are provided for fixed association with the bladder in strategic locations on the surface of the conformable layer to fill in small open spaces on the interior of a passageway which predictably present themselves between mated sections of inflated bladders.

21 Claims, 2 Drawing Sheets

INFLATABLE BLADDER FOR CONTROL OF FLUID FLOW

FIELD OF THE INVENTION

The present invention is an inflatable bladder for damping the flow of fluid through a duct such as a heating or air conditioning duct and a system of control of flow of conditioned air to a given zone. More specifically, the invention is an inflatable bladder type damper device which may be installed by mere manual insertion in a duct or other fluid passage and which upon inflation acts to limit or block the flow of fluid therethrough. Upon release of pressure from the bladder it is substantially completely self-deflating to allow increased flow of fluid through the passage. The bladder disclosed, although inflatable with any of a number of fluids, is herein described primarily in relation to being inflated with air because of its ready availability and economy.

Among a number of modern day advances in control of air flow in heating and air conditioning systems has been a movement toward zoned temperature control systems. In such systems each zone or individual room is provided a temperature control unit, such as a thermostat for sensing temperature in the zone and using the temperature signal to regulate the flow of conditioning air to the zone as described in applicant's U.S. Pat. Nos. 4,522,116 and 4,662,269. Although electronic temperature sensing devices for air conditioning systems are easily installed, flow control devices available for the systems, such as the commonly used pivotal butterfly plates or vane dampers, are relatively much more difficult to install, both in existing and new air conditioning systems. In addition, such damper control devices usually require extra mechanisms, often complex, to permit adjustment of flow. Installation of such dampers in existing systems usually requires reconstruction or mechanical surgery which results in potentials for leaks with an accompanying loss in energy.

In view of these problems it is an object of the present invention to provide a new type inflatable damper which can adjustably respon to temperature signals and which can be installed in ducts or fluid passageways without need for special fabrication or reconstruction of the passageways.

In this regard, it is a further object that the damper not require a special housing but be capable of using existing passageways as the housing and that it be capable of installation preferably from within the confines of the passage.

It is a still further object of the invention to provide a damper which can be installed without need for special cutting, drilling, bolting, sealing or reconstruction of the fluid passageways but which may be merely manually inserted as a reliably operable installation.

In addition, it is an object of the invention that the damper be readily adaptable to control by electornic means such as modern thermostatic controls as well as to time shared computer regulation in modern air conditioning systems.

BRIEF DESCRIPTION OF THE INVENTION

The invention is an improved inflatable damper which makes possible provision of a new efficient and low cost automatic air flow balancing system to promote energy savings and comfort in homes or in offices or commercial establishments. It enables elimination or reduction of temperature differentials between hot and cold spots in such spaces. The usual single thermostat controlled systems can be economically replaced by a system incorporating the invention using individual sensors which can be scheduled to set the temperature in all parts of an overall dwelling space. If in the hot summer reason, the kitchen or upstairs area of a home becomes too hot, ducts to other parts of the home can be programmed for automatic shut-off, to supply more air to the areas usually in use. As a result, comfort can be maintained and energy savings are experienced since the rest of the home is not over-cooled as is often experienced with single thermostat systems, in an attempt to get relief in the hot areas in use.

Although described herein principally in relation to a system of air flow control for heating and cooling air conditioning systems the invention, it will be recognized, has broader application in that the bladder construction lends itself to control of fluid flow more generally, such, for example, as for control of gas flow in environmental control systems or liquid flow control in water and petroleum product flow control systems.

The improved damper of the invention in overall character is a generally flat semi-rigid flexible bladder device which is majorly an assembly of two layers of material joined together in sealed relation and having an air inlet connection. One layer is a thin flat base sheet of semi-rigid flexible material which can be flexed and bowed under applied force but which will return to a flat condition upon removal of such forces. That is the base sheet which predominantly establishes the overall flex characteristic of the assembly has a stable substantially planar shape or shape memory from which it can be deformed into a bowed or flexed condition, but to which it will return upon release of external forces. The second or overlayer of the assembly which may in some instances be the same as the base sheet in most instances is preferably more flexible and more conformable than the base sheet. Accordingly when the assembly is inflated the overlayer conforms to the inflating fluid and will take on an inflated somewhat one sided balloon-like shape without exerting as much force of internal stress on the assembly as the base sheet to return the assembly to its original flat shape. The overlayer may have a memory less effective than its base sheet and might be of stretchable material, but is preferably nonstretchable permitting reinforcement, such as with cloth, provided for greater inflation strength and temperature stability in the range of temperatures of use of the bladder. When installed in a fluid passageway this bladder assembly upon inflation becomes an enlarging restriction which acts as a larger obstacle reducing the opening for flow of fluid through the passageway. Accordingly, it is adaptable to use with control systems to limit or block flow of the fluid.

This assembly also can be provided a circular or loop form by bringing its ends together to the size desired and suitably joining its ends whereupon it can be inserted in a correspondingly sloped circular passageway or flexed to fit into an oval, a square, a rectangular or other shaped passageway for which it is sized.

The outer layer in lining the passageway in which it is inserted is limited in its outward expansion by the passageway itself thereby causing the inflating fluid to be accommodated by the inner layer. The inner or overlayer thus rises inwardly and thereby causes obstruction of fluid flow through the passageway. The edges of the base sheet are simultaneously pulled to cause it to be drawn to a flexed or somewhat bowed shape. In such condition, because of its shape memory, the internal stresses of the outer layer increasingly resist continued inflation of the assembly. In this regard, the base sheet thereby is caused to act somewhat as a spring under increasing stress as the assembly is inflated.

As a variation of the preferred embodiment, two equal sheets of material each with its own shape memory can be formed into a bladder of this invention but each of which has an expandability when fluid is introduced therein. When such a bladder is inserted, for example, in a cylindrical passageway, the exterior layer functions in cooperation with the wall of the passageway such that the wall provides the limit of expansion as well as the strength for the outer layer. Thus upon expansion, the wall of the passageway and the outer semi-flexible conformable layer of the bladder together provide the cylindrical memory function and outer strength for stability of the inwardly expanding inner layer. Thus the need for a thicker outer base layer is in part provided by the wall of the passageway. The inner layer thus expands toward the center of the passageway with the wall of the passageway acting with the outer bladder layer to provide the dimensional stability which would otherwise be provided by a thicker layer.

In still another embodiment, two coextensive semi-flexible conformable layer sheets can be provided in sealed relation with an interior or middle layer of semi-rigid flexible material which has a dimensional memory to impart the form and dimensional stability to the combination. The interior memory layer cna also be porous to provide fluid communication from end to end of the bladder.

Upon release of air pressure from the bladder, the internal stress of the base layer acts to return the bladder assembly to its stably flat condition. At the same time the base layer pulls at the overlayer sheet to progressively deflate the bladder assembly to its originally flat condition. The bladder assembly thus is made completely self-deflating and readily adaptable to being pumped or deflated to any degree of expansion called for by signals supplied by electronic controls. Flow of fluid through the passageway thus can be correspondingly closely controlled or regulated.

For control of flow through a passageway having an endless surface such as a circular or an oval passage, or through a multi-sided passageway such as a square or rectangular passageway, the bladder may be formed into a loop. This can be accomplished by bringing its ends together with the base layer on the outside and securing them together such as with adhesive tape. The bladder when provided in the form of a loop is made of size for snug-fit or tight-fit engaging association with the interior of the passage, when proded in the form of a loop, such that it lines the passageway so that fluid flowing therethrough will not pass between the wall of the passageway and the cylindrical bladder assembly. Alternately, the bladder can be a semi-flexible flat loop with an endless pathway therethrough, the loop being of size to permit snug fit conformation to the cross-sectional shape of the passageway. When the bladder is inflated in such a position, the flexible inner conformable layer expands into a series of connected inflated pockets. By way of example, in circular passageways the bladder has the unexpected characteristic of tending to form naturally into a series of three equal sized inflated pocket-like sections each of which expands toward the center of the cylindrical passageway. A relatively small central triangular opening thereby results as the three pockets of the bladder approach full inflation. To fully close this small opening an extra undesirably large last amount of bladder pressure is found necessary. To eliminate the need for this extra material or pressure, a matching triangular blocking member is provided which is secured in fixed relation on one of the pocket section portions of the bladder which moves to the center opening as the pockets approach full inflation. Thus the inflated bladder with the central blocking member can effectively block fluid flow without the requirement of an extra large pressure to the bladder to have it close the small central portion of the passage. Although disclosed herein in triangular form, other shapes for such a block can be provided to match openings of other shapes.

Where the fluid passageway has a sharp cornered cross-sectional configuration such as a square or rectangle, a bladder of loop form can be flexed or fired in shape to line the passageway and rounded corners or billing material in the corners can be provided to establish a snug-fit relation with the passageway. Alternately, the bladder can be patterened with slots at the region of the sharp 90° corners to permit sharper bending of the bladder assembly to closely match the passageway without injury to a stiffer base layer and also to promote formation of four pocket sections of predetermined size for approach to each other to control fluid flow. A strip of porous material such as screen material is provided in extended relation through at least the 90° corner regions of the continuous length portion of the bladder to assure an air passage connection between pocket sections where the multiple pocket sections are all supplied with air from one inlet connection.

As a desirable modification in many instances, the square or rectangular bladder can be provided its own partial metal housing for insertion in the corresponding square or rectangular duct with which it is to be operated. This may in some instances be necessary since the typical square or rectangular duct may not be strong enough to withstand the internal pressures of the expanded bladder.

The bladder assembly in some cases of high velocity fluid movement through a passageway may be desirably secured to the wall of the passageway in which it is inserted, such as by adhesively fastening the edge of the upstream side of the bladder to the wall of the passageway. Such a leading edge securing arrangement provides capability of functioning well with high velocity fluid flows in that the leading edge of the bladder in being secured in place will not conflict with the flow of fluid through the passageway.

A feature of the invention is that it is a slip-in portable air control device readily insertable and removable from air passageways including modern flexible ducting. It is self-sealing and self-deflating. It does not require reconstruction or mechanical surgery of existing systems which usually provide potentials for leaks when conventional dampers are installed. It is also self-anchoring in being provided a configuration to conform in shape and size for tight fit association with the interior of the fluid passageway in which it is installed.

Another feature of the invention is that it utilizes existing ducts or passageways as the damper housing and can be mad eot fit any of a range of sizes of ducts or other passageways.

Still another feature is that the installed damper need not be connected to surrounding walls of the passageway and in use creates little stress on the inner wall of a duct and will not weaken or distort the duct when expanded. In not being connected to the walls of the passageway it does not generate a whistle during blockage of the fluid flow through the duct as is frequently experienced with dampers secured to surrounding walls.

A further feature of the invention is that beside being adaptable to use in modern flexible plastic or fiberglass ducting, it can also be readily used in older rigid steel ducting. Conventional mechanical dampers, in contrast, in flexible ducting require construction of a special platform to support the damper with consequent additional cost.

Other objects and features which are believed to be characteristic of my invention are set forth with particularly in the appended claims. My invention, however, both in organization and manner of construction, together with further objects and features thereof may be best understood with reference to the following description taken in connection with the accompanying drawings.

DESCRIPTION

Figure 1:
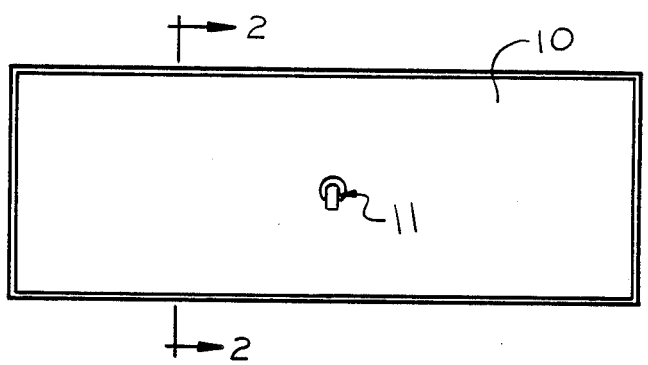
FIG. 1 is a top plan view of a bladder type damper of the present invention showing an inflating inlet centrally located between its ends.

Referring to the drawings in greater detail, FIG. 1 shows an overall shape of a bladder assembly 10 of the invention which is rectangular and has an air inlet 11 which can be located conveniently to permit pressurized inflation of the bladder.

Figure 2:
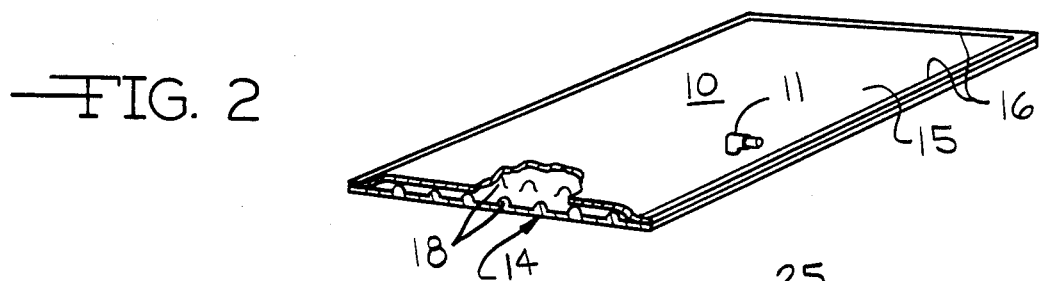
FIG. 2 is a cross-sectional veiw in perspective of the bladder of FIG. 1 as taken on line 2—2.

FIG. 2 shows the bladder assembly of FIG. 1 in cross-section as taken on line 2—2 wherein it is seen that the overlayer or top sheet 16 is sealed at its edges 16 to a naturally flat base sheet 14. The top sheet is of flexible conformable material which may not have a memory to which it would naturally return whereas the bottom sheet is semi-rigid and flexible and as such has a memory from which it can be bowed or flexed under manual and inflation forces. Embossments 18 on the inner side of the base sheet 14 are distributed throughout the inner surface to provide a slight separating space 19 between the base and overlayer sheets 14 and 15, respectively, so that air pumped between the layers has a path of flow for the full length of the bladder regardless of the degree of flexing or bending to which it might be normally subjected. The separation need only be about 1/16" or more to provide the air path desired. The embossments 18 may be deleted and substituted instead by one or more strips of porous material such as screening located in predeterminable regions to be bent or bowed in use. Where no flexing or bending is to occur, no such preparation is required.

The base sheet 14 has a memory such that when it is bowed or flexed, as when the top layer is expanded to a larger degree than is shown in FIG. 2, its internal stress forces will be exerted at the edges of the overlayer 15. Thus when pressure is released, such as from the air inlet circuit to the interior of the bladder, the base sheet internal stress forces will act to force air out of the interior inflation region to cause the assembly to evacuate air from the inbetween space until it is fully deflated.

Figures 3, 4:
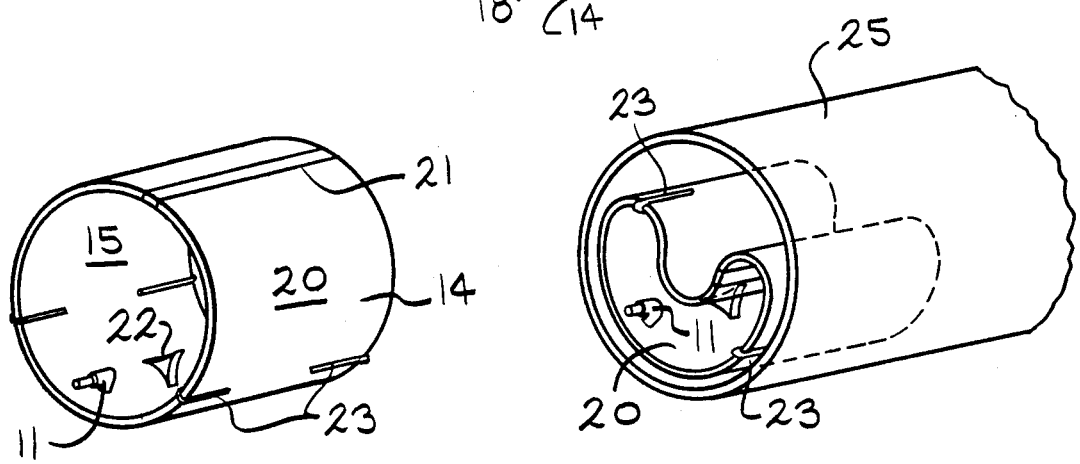
FIG. 3 is a perspective view of the bladder of FIGS. 1 and 2 shown in cylindrical form in which the ends of the bladder are joined to form the cylinder.
FIG. 4 is a perspective partially broken away view of a duct in which the cylindrical shaped bladder of FIG. 3 is folded for insertion in the duct.

The bladder 10 of FIGS. 1 and 2 can be made into a cylindrical form 20 by joining its ends as shown in FIG. 3, the ends being joined such as with a tape strip 21. In this arrangement the base sheet 14 is located on the outside of the cylinder to provide the dimensional stability of size corresponding to the air passage into which it is to be inserted. Inflation of the cylinder results in inward expansion of the conformable sheet 15. In being semi-flexible as determined by the layer 14, the bladder assembly 10 can be readily folded manually and inserted in a duct 24 as shown in FIG. 4. The cylinder 20 is made to fit in close tight fit relation within the duct so that it becomes self-anchored and can be readily assembled into a cylinder on the job site.

Although the bladder 10 may thus be made to fit any of a number of duct sizes, when the number of sizes is limited, standard sized bladder cylinders can be economically provided under such circumstances, the exterior base layer 14 can be provided in the form of a semi-flexible seamless tube and the inner conformable layer can be made of a corresponding continuous seamless layer 15 sealed to the interior of the outer layer 14 to form in a sense an annular or tubular bladder.

Figure 5:
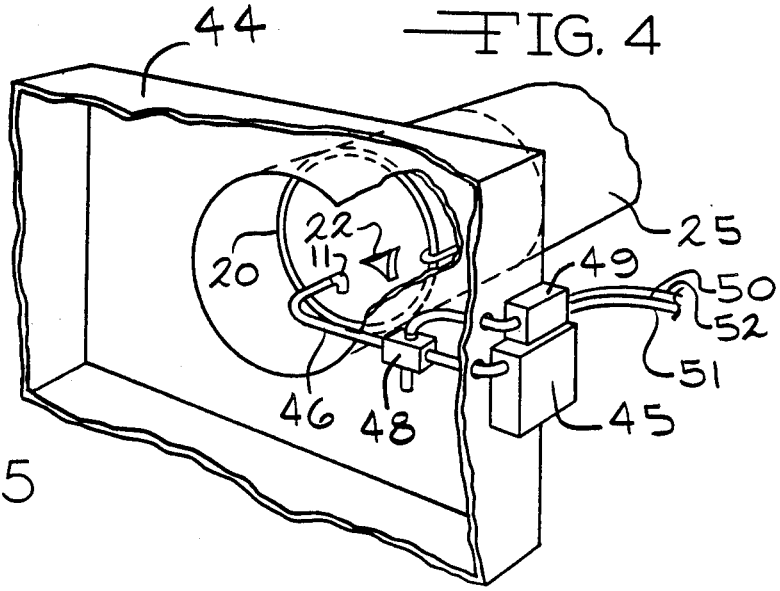
FIG. 5 is a partially broken away view of the duct of FIG. 4 showing the cylindrical bladder in its snug fit finally installed condition with electric circuitry and components for regulating the degree of expansion of the damper.

FIG. 5 illustrates how the bladder cylinder 20 resides in self-anchored condition within a duct 25 connected to an air supply plenum 44 and how the duct acts as a housing for the cylindrical form. In this respect, when the duct is of modern corrugated spring wire reinforced plastic type the duct and bladder cylinder are mutually supportive and strengthening. When inflated, pressures exerted outwardly on the layer 14 cause a more positive, substantially non-movable engagement of the bladder assembly with the interior of the duct. A set of three reference clip members 23 spaced 120° apart each extend over the edge of the cylindrical form to establish a loose location setting or line marking relation with the outside and inside layers, respectively, which is sufficiently loose so that air can pass through the bladder interior in the clipped regions. The clip members are aligned in their equally spaced relationship from both sides of the cylinder to locate reference or dividing lines between adjacent interconnected expanding pockets of the cylinder. In addition to although hair-pin shaped clips are here shown, any of a number of conventional non-closing pinching clips can be used for the division reference function just so air can pass through the clipped regions.

The plenum 44 is supplied with conditioned air from a conventional air temperature reducing unit (not shown). In controlling the amount of air flow, the bladder 20 is enlarged or diminished in size as determined by conventional thermostatic controls having a temperature selection or setting arrangement (not shown). The controls effect energization of an inflating pump 45, such as a conventional vibratory pump, which supplies air under pressure to the bladder 20 by way of tubing 46 connected to the bladder air inlet 11. An electrically activated air release valve 48 allows release of air from the self-deflating bladder so that its size will diminish to allow flow of air through the duct 25. Electrical wiring connected to the pump 45 and the air release valve 48 include a common lead 50 connected by way of an electrical connecting box 49 to both the pump and release valve while a lead 51 connected to the release valve 48 supplies a signal from the thermostatic controls to open or close the release valve. Another lead 52 is connected to the pump 45 over which signals are supplied from the thermostatic controls to dictate its activation to inflate the bladder cylinder 20. Thus the bladder can be increased in size under pump action or diminished in size by its own self-deflating action under control of a temperature sensing and control loop for the zone to be temperature controlled. Although the pump and electrical components are here shown in relation to supplying expansion fluid to a single bladder assembly, in practice the single pump and related electrical components are arranged to supply fluid to a number of bladders in turn as determined by the thermal sensing equipment and associated programming components. Humidity in a zone may be similarly controlled with appropriate sensing devices in place of or in addition to temperature.

Figure 6:
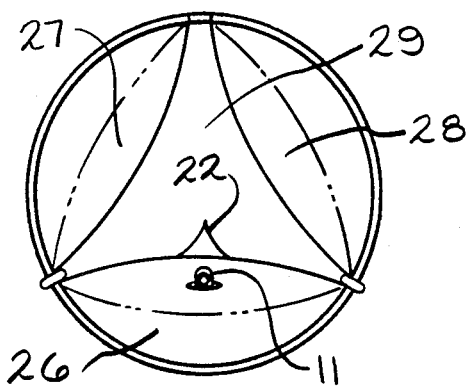
FIG. 6 is an end elevational view of the duct of FIG. 5 showing the bladder in partially expanded condition with three sections thereof in enlarged condition approaching the center of the duct.

FIG. 6 illustrates how upon expansion of the cylindrical bladder 20 the inner and outer layers 14 and 15, respectively, divide off into three adjacent pockets 26, 27 and 28 which upon continued expansion diminishes the size of the passageway opening to form a central triangular space 29. The inner layer it has been found will naturally expand into three such adjacent pocket regions, but by placing clip members 23, such as hair-pin shaped clips in the edge regions of the cylinder, the formation of the equal sized natural pockets is promoted from the beginning of inflation. A smoother and reliable progressive expansion of the pockets to a substantially equal volume relationship is thus assured with minimized shifting of air from pocket to pocket such as otherwise frequently occurs when expansion is allowed to progress independently of provision of such reference mechanisms.

In other words, the main function of the reference dividing clips is to insure that the flexible damper divides consistently into equal parts, thereby insuring that the air blocks end up in the exact location desired upon approach to full expansion of the bladder. The reference clips might be replaced by spot integration of the two layers in spaced regions of the assembly but it is preferred that positionable clips be used for customized location because of variations in dimensions that are experienced in different ducts.

Figure 7:
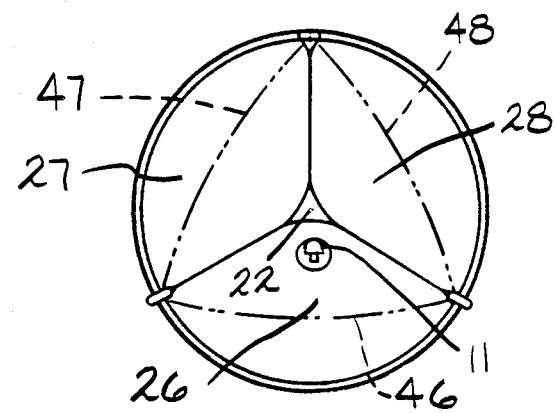
FIG. 7 is an end elevational view of the duct shown in FIG. 6 in which the bladder is expanded to their full degree to effect closure of the duct against flow of fluid therethrough.

FIG. 7 shows the end of the duct 25 with the air pockets 26, 27 and 28 almost completely expanded on opposite sides of their seams 46, 47 and 48, respectively, to closure against air flow therethrough except for a small central region 29. The air pockets can be inflated still further than shown in FIG. 7, but an undesirably large amount of additional pressure is required to effect complete closure of the opening. This amount of pressure is proportionately unduly large compared to the amount necessary to arrive at the degree of closure shown in FIG. 7. Accordingly it has been found desirable to provide instead a triangular blocking member 22 on the central region of one of the pockets such as at the center of the portion of the layer 15 which forms the pocket region 26. When so placed, upon approach to full expansion of the pocket 26 to the central opening 29, the block 22 will move into place to completely block flow of fluid through the duct without need for application of undue extra pressure to the bladder. The air inlet 11 might be located to provide an anchor for the triangular air block 22.

As the bladder expands into the three pockets or compartments, pressure exerted at the three regions of contact with the duct between pockets are pressurized such that air flow tends to be pinched off except for the presence of the interior embossments 18 on the base sheet 14 which maintain an interior separation space between the layers 14 and 15 adequate to provide flow communication between the compartments. Such separation can alternately be provided by embossments or a textured surface on one or opposite interior surfaces of the bladder. By way of example, embossments can be provided on the interior surface of layer 15 as shown or the deflation separation can be provided instead by screen material or other porous material extending through the space between the two layers to assure a channel of flow communication between pocket compartments.

While the length of the bladder is made sufficiently longer to permit lining of the perimeter of the passageway in which it is inserted, the width is made sufficiently large to provide adequate layer material to allow its expansion from the wall of the passageway which it lines to meet pockets of opposing and any adjacent wall portions of the passageway. By way of example of general dimensions and material specifications for a successful construction of the invention, the semi-rigid flexible base sheet 14 can be 50 mils thick while the overlayer sheet 15 can be made of 15 mil thickness. For a standard 8" diameter duct, the bladder might be made in the form of a continuous circle or a bladder 25.2" long and 9.5" wide can be formed into a cylindrical loop for insertion in the duct. Although a number of materials can be used to provide the desired functional results of the invention, an example of materials found well able to provide the desired results are polyurethane for the conformable layer and a polyester elastomer for the base layer such as an elastomer sold by Dupont under the name Hytrel.

Figure 8:
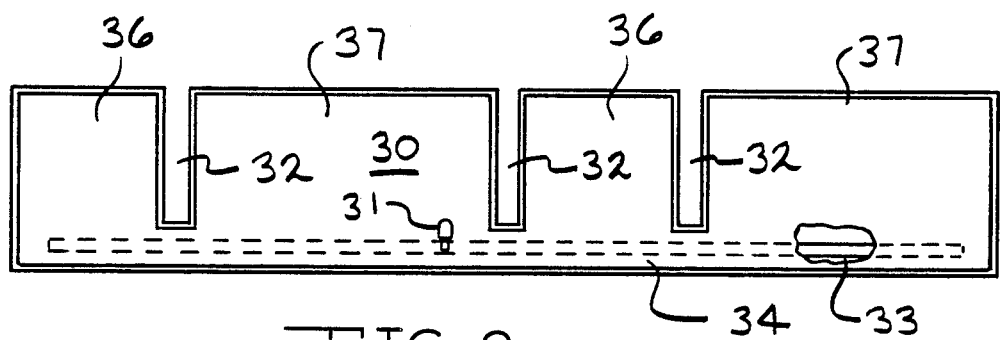
FIG. 8 is a top plan view of a bladder of the present invention patterned with lateral portions and slots incorporated therein to permit formation of a square or rectangular configuration for insertion in correspondingly shaped fluid passageways.
Figure 9:
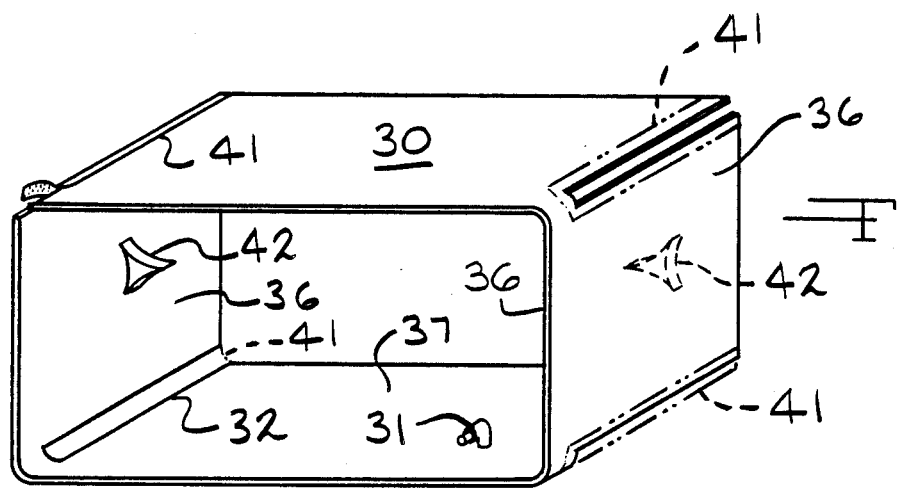
FIG. 9 illustrates the manner in which the bladder of FIG. 8 can be joined at its ends with 90° bends at the slots to form a rectangular form for installation in a rectangular fluid passageway.
Figure 10:
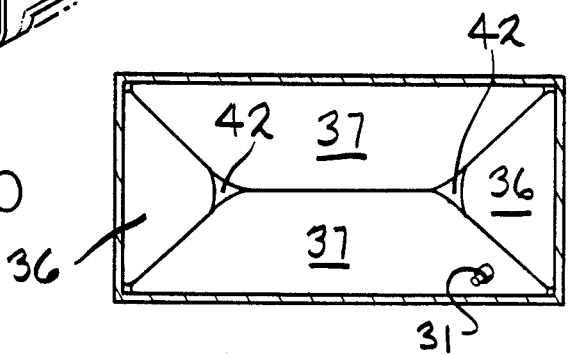
FIG. 10 is an end view of a rectangular duct showing the bladder of FIGS. 8 and 9 in fully inflated condition to block flow of fluid through the duct.

FIG. 8 illustrates how another embodiment of the invention can be arranged to be shaped into a square or into rectangular form to match correspondingly shaped air passageways into which they can be inserted for flow control. The bladder 30 is provided with a series of adjacent compartment sections 36 and 37 of short and long dimensions, respectively, while the other side of the bladder 34 provides a continuous longitudinal channel of communication from end to end. An air inlet 31 is located for convenient communication of air supply tubes when the bladder is located in a duct or other passageway. A strip of porous material such as screening 33 is interiorly located in the longitudinal portion 34 of the bladder to assure air flow communication from end to end when the lbadder is shaped into a rectangle as shown in FIG. 9. The slot corners of the rectangular configuration as shown in FIG. 9 are covered with adhesive tape 41 which acts to join the edges of the sections 36 and 37 and hold the assembly in desired form. As alternates the slot regions might have molded-in corners or the corners might be provided without slots. Triangular blocking members 42 are shown fixed to the mid-region of two side compartment portions 36 of the bladder 30 to block the small openings formed at the merger regions of compartments when the bladder is expanded to full air blocking position as shown in FIG. 10 where two longer pockets 37 and the two end pockets 36 merge.

The cylindrical form of the bladder 10 and the rectangular bladder 30 ar shown and described mainly as free standing forms which can be installed in existing air conditioning ducts but they can also be preassembled in a duct section, whether circular or rectangular, which can be installed in a section in a run of duct of an air conditioning system. In other words, the bladder can be provided with its own housing which can be installed as a section of a duct run. Alternately, one or more outside retaining bands or straps such as of fiber reinforced resin or of steel can be placed about the outside of the bladder in its duct shape configuration to protect the duct from forces exerted outwardly by the bladder during operation.

In view of the foregoing, while the invention has been described with regard to the illustrated embodiments, it will be recognized that my invention is not limited specifically to the particular arrangements shown and described, and accordingly, by the appended claims all modifications, adaptations and arrangements thereof are contemplated which fall within the spirit and scope of the invention.

I claim:

1. A fluid expansible portable bladder for insertion in a fluid flow passage for use as a damper in a fluid flow system comprising an assembly of a generally flat base layer of semi-flexible material having a shape memory,
    an overlayer of fluid conformable material sealed at its edges to said base layer and
    said assembly being sufficiently flexible to permit opposite edges of said assembly to be brought to each other to form a loop for flatly lining the interior surface of a fluid flow passage, the semi-flex property of said base layer being such that said loop can be manually collapsed for insertion in said fluid flow passage and having a shape memory such that upon release from a collapsed condition said assembly returns to said loop configuration to line said passage,
    connection means associated with said assembly for connecting a supply of inflating fluid to said bladder,
    said conformable overlayer being capable of accepting said fluid to expand the assembly,
    the semi-flex property of said base layer being such that said base layer is flexed by pull forces at its edges and thereby internally stressed as said assembly expands whereby upon release of inflation pressure from the assembly said base layer exerts stress forces on said overlayer acting to return the assembly to its generally flat shape and thereby deflate said assembly.

2. A fluid expansible bladder assembly as set forth in claim 1 wherein means is provided in the space between said layers to maintain a space between said layers when the assembly is deflated whereby air passages are provided in zones where pinching flexure of the assembly may occur.

3. A fluid expansible bladder as set forth in claim 2 wherein said means comprise embossments on the interior surface of one of said layers.

4. A fluid expansible bladder as set forth in claim 2 in which said means comprises a strip of screening material.

5. A fluid expansible portable bladder adaptable to insertion in a fluid flow passage for use as a damper in a fluid flow system comprising a longitudinal assembly of a generally flat base layer of semi-flexible material having a shape memory,
    an overlayer of fluid conformable material sealed at its edges to said base layer and
    connection means associated with said assembly for connecting a supply of inflating fluid to said bladder,
    said conformable overlayer being capable of accepting said fluid to expand the assembly,
    the semi-flex property of said base layer being such that said base layer is flexed by pull forces at its edges and thereby internally stressed as said assembly expands whereby upon release of inflation pressure from the assembly said base layer exerts stress forces on said overlayer acting to return the assembly to its deflated generally flat shape,
    the ends of said longitudinal assembly being joined together to form said bladder into a cylinder with the base sheet on the outside of the cylinder,
    said cylinder being of dimension corresponding to the interior dimensions of a duct into which it is to be installed.

6. A fluid expansible bladder as set forth in claim 5 in which reference clip members are provided in gripping relation with the exterior and interior surfaces of said cylinder at spaced regions about said cylinder whereby reference regions are gripped about the cylinder for prefixing the regions between adjacent expansion pockets.

7. A fluid expansible bladder as set forth in claim 6 in which a blocking member is provided on the interior surface of said cylinder corresponding to the central space formed upon inflation of expansion pockets of said bladder as full inflation is approached.

8. A longitudinal fluid expansible bladder assembly for use as a damper in air conditioning systems,
    said bladder comprising an assembly of two coextensive layers sealed at its edges against leakage of inflating fluid therefrom,
    one of said layers being adaptable to lining the interior perimeter of at least a portion of an air flow path of an air conditioning system,
    the other of said coextensive layers being conformable to inflating fluid supplied to said bladder, said assembly being sufficiently flexible to permit opposite edges of said assembly to be brought to each other to form a loop for flatly lining the interior of said air flow path, the semi-flex property of said assembly also being such as to permit manual collapse of said loop for insertion in said air flow path and upon release frm its collapsed condition result in its return to said loop configuration to line said flow path, means for supplying inflating fluid to said bladder, at least one of said layers being internally stressed when said bladder is inflated and means for release of inflating fluid from said bladder whereupon said bladder acts to deflate itself under the force of the internal stress of at least said one layer.

9. A fluid expansible bladder assembly as set forth in claim 8 in which the bladder is generally patterned with a longitudinal section and lateral extensions therefrom with slots between it which said bladder can be bent to conform to rectangular air passageways, said lateral extensions each having air communication with said longitudinal portion to permit inflation of each from said longitudinal portion, means interior of said longitudinal portion to maintain a separation between said layers to permit fluid supply between said layers for the full length of said longitudinal portion.

10. A longitudinal fluid expansible bladder assembly for use as a damper in air conditioning systems, said bladder comprising an assembly of two coextensive layers sealed at its edges against leakage of inflating fluid therefrom, one of said layers being adaptable to lining the interior perimeter of at least a portion of an air flow path of an air conditioning system, the other of said coextensive layers being conformable to inflating fluid supplied to said bladder, means for supplying inflating fluid to said bladder, said one of said layers being internally stressed across its width when said bladder is inflated and means for release of inflating fluid from said bladder whereupon said bladder acts to deflate itself under the force of the internal stress of at least said one layer, said bladder being provided in a retaining housing, said housing being adaptable to insertion as a duct section for provision of a damper controlled air flow path therethrough in an air conditioning duct system.

11. An assembly as set forth in claim 10 in which said air flow path is circular.

12. An assembly as set forth in claim 10 in which said air flow path is square or rectangular.

13. A portable fluid inflatable generally flat longitudinal bladder assembly having its ends brought together to form the bladder into a loop configuration matched in dimension to the interior of a fluid flow passageway into which it is inserted and for control of fluid flow in said passageway, said bladder comprising a pair of coextensive flexible layers of fluid impermeable material, said layers being joined together in sealed relation at the edges of said bladder, an inlet for introduction of fluid into said bladder, at least one of said layers being conformable to fluid introduced into said bladder to expand said bladder and flexible semi-rigid shape-imparting means incorporated in said bladder assembly which is subject to being stressed sufficiently when said bladder is formed into a loop to exert outward force on the assembly to cause it to perimetrically line the fluid flow passageway into which it is inserted.

14. An inflatable bladder assembly as set forth in claim 13 in which said flexible semi-rigid shape imparting means comprises at least one of said layers.

15. An inflatable bladder assembly as set forht in claim 13 including separating means maintaining a flow path between said layers for inflating fluid when said assembly is in deflated condition.

16. An inflatable bladder assembly as set forth in claim 15 in which said separating means and said shape imparting means comprise a member extending through the length of said assembly.

17. An inflatable bladder assembly as set forth in claim 16 in which said separator member is porous.

18. An inflatable bladder assembly as set forth in claim 15 in which said separator means is a layer of screen material.

19. An inflatable bladder assembly as set forth in claim 15 in which said separating means is integral with the interior surface of at least one of said layers.

20. A portable fluid inflatable generally flat longitudinal bladder assembly adaptable to having its ends brought together to form the bladder into a loop configuration matched in dimension to the interior of a fluid flow passageway into which it is inserted and for control of fluid flow in said passageway, said bladder comprising a pair of coextensive flexible layers of fluid impermeable material, said layers being joined together in sealed relation at the edges of said bladder, an inlet for introduction of fluid into said bladder, at least one of said layers being conformable to fluid introduced into said bladder to expand said bladder, flexible semi-rigid shape-imparting means for said bladder assembly which is subject to being stressed sufficiently when said bladder is formed into a loop to exert outward force on the assembly to cause it to perimetrically line the fluid flow passageway into which it is inserted, said bladder as a loop being combined with said fluid passageway by being positioned therein lining the interior perimeter of a section of said passageway with said conformable layer facing the interior of said passageway.

21. An inflatable bladder assembly as set forth in claim 20 in which said passageway in cross-section has a multisided shape.

* * * * *